United States Patent Office 3,511,327
Patented May 12, 1970

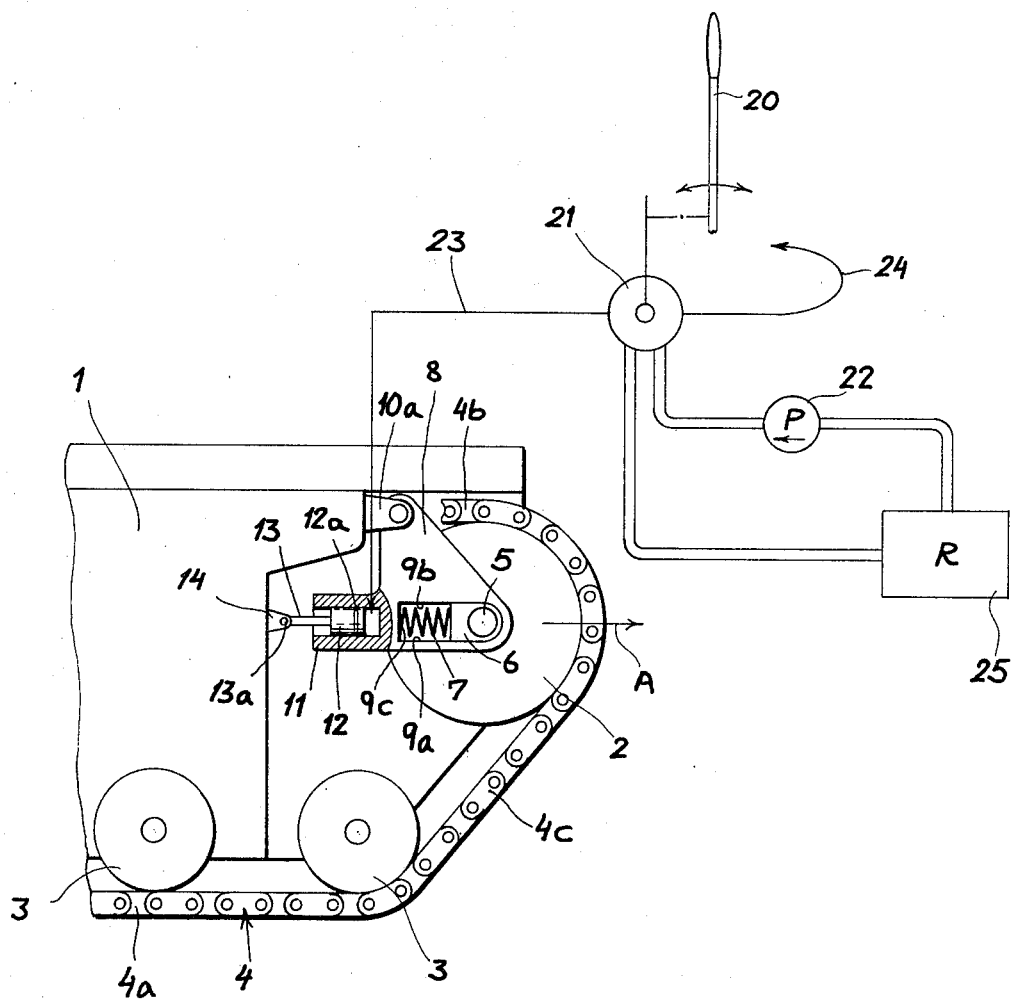

3,511,327
BRAKE SYSTEM FOR TRACKED VEHICLES
Karl Schlör, Biebesheim (Rhine), Germany, assignor to Alfred Teves G.m.b.H., Frankfurt am Main, Germany, a corporation of Germany
Filed Jan. 8, 1968, Ser. No. 696,349
Claims priority, application Germany, Jan. 11, 1967, T 32,957
Int. Cl. B62d 11/02
U.S. Cl. 180—6.7  8 Claims

ABSTRACT OF THE DISCLOSURE

A steering-brake mechanism for track vehicles in which the compensating roller between the return pass and the working pass of the endless-chain track is mounted upon a triangular bracket pivotally connected with the vehicle body and in a journal block shiftable in the triangular support against a compression spring; the support has a hydraulic cylinder whose piston acts upon the chassis at another pivot to adjustably tension the track in response to the command of the operator of the vehicle to reduce the speed of the track by increasing the resistance of its rollers and coupling it more effectively to the engine in its engine-braking mode.

---

My present invention relates to a brake system for tracked vehicles and, more particularly, to a track-braking arrangement for dual-track vehicles in which the brake installation serves at least in part for steering the vehicle.

Heavy-duty track-laying vehicles, in which an endless track on each side of the vehicle is driven by a respective sprocket or spur wheel by the engine and a speed-changing transmission and passes around a plurality of ground rollers and support rollers, are in common use in industry, agriculture, construction and military fields. It should be understood, therefore, that all such track-laying vehicles are intended to be encompassed in the following discussion although the vehicles may be treated hereinafter as agricultural and earth-moving dozers and tractors.

In track-laying vehicles, the endless tracks on opposite sides of the vehicle pass around track-support rollers along the return or upper pass or run of the track and then are deflected downwardly around an idler or compensating wheel to a series of road wheels from which the track rises again to the final-drive sprocket before returning to the track-support rollers. In general, the road wheels are resiliently supported by specially designed springs and suspension arms; the idler or compensating wheel generally maintains the track out of the suspension system located between the two passes and also serves to maintain a given track tension. Vehicles of this type are in common use for heavy-duty work which cannot be carried out by rubber-tired vehicles and generally are used when large ground-engaging areas are required for support of the weight of the vehicle. Typical uses of such tracks are in military vehicles, e.g. tanks, troop carriers and gun-supporting carriages, in construction for dozers, front-end loaders, scraper-towing tractors and cranes, in agriculture for deep-plowing tractors or soft-soil cultivation, etc. In general, such vehicles are steered at least in part by selective braking of one or the other track, it being recognized that, when the right-hand track is rendered immobile while the left-hand track continues to rotate or the right-hand track is slowed relatively to the left-hand track, the vehicle will veer to the right and vice versa. Normally, track-laying vehicles provide individually operable right and left brakes for such steering and in more complex systems, mechanisms for braking both tracks concurrently or combination arrangements in which the tracks can be individually braked in one operative mode of the system and jointly braked in another. The apparatus required for such purposes may be friction brakes engaging the driving wheel or sprocket of the vehicle track or one of the other wheels thereof. Such systems are made up of many parts and are relatively complex and prone to breakdown under the severe conditions in which such vehicles are employed. Moreover, conventional track-laying vehicles have been provided hitherto wtih devices for tensioning the endless track as has been indicated generally earlier, such devices providing a general tension, especially in the region in which the track returns downwardly to its road-engaging lower pass, which is proportional to the weight of the chain. These systems have the function of preventing the track from undulating and thereby dislodging from the road rollers and/or track-support rollers upon acceleration and deceleration of the vehicle.

With the aforedescribed state of the art in mind, it is the principal object of my present invention to provide an improved braking system for a track-laying vehicle.

Another object of this invention is to provide a steering brake selectively operable on either track of such a vehicle which is of simplified construction and requires minimum maintenance and can be installed on existing vehicles.

Still another object of my invention is to provide a brake system for a tracked vehicle which operates with greater assurance and more effectively than earlier brakes involving frictional surfaces in track-laying vehicles.

I have found that these objects can be obtained in a system which provides means for increasing the tension on the track to be braked beyond that provided by the normal track-tensioning system under the control of the vehicle operator and preferably through fluid-responsive means acting upon a compensating or idler wheel which, for this purpose, is movably mounted on the vehicle chassis. This invention is based upon the fact that it is possible to use, as a practical matter, the relatively high braking effectiveness of the normal transmission and drive train of the vehicle as a running brake and to augment this engine-braking effect by friction increased by the increasing tension on the track. In other words, the present invention provides that the braking capacity of the idling engine, via the high-efficiency (high gear ratio) transmission which together present a resistance to movement far above that normally encountered in wheeled vehicles, be used in the present system in conjunction with a friction braking generated by the increased force applied by the tension chain to the road and support rollers. It has been found that, in most vehicles of this type, the inertia of movement of the vehicle on its tracks may readily be overcome by the drag of the engine and speed-reducing gearing of the vehicle in combination with the track-tension effect described above so that additional friction braking of the rotating parts is not required although frictional brakes are commonly used subsequently.

According to a more specific feature of this invention, the idler or compensating roller of each track is acted upon by a hydraulic cylinder, which reacts against the vehicle body, under the control of a hydraulic valve or master cylinder actuatable by the operator of the vehicle preferably via a cushion which applies to the idler or compensating roller the necessary resilient force to prevent breakage of the track. In effect, therefore, the tension of the track is selectively increased in a more or less continuous manner from its normal pretension to a higher level at which the friction between track and spur gear or sprocket teeth, the friction-contacting surfaces of the rollers and other track surfaces, and the friction between the rollers, wheels and sprockets and their respective shafts, are all increased to create a usable brake force.

A more specific feature of this invention resides in the application via a hydraulic cylinder of operator-controlled force to a support member forming a seat for the cushioning spring and in which the journal blocks for the idler or compensating roller are shiftable parallel to the effective direction of the spring, the hydraulic cylinder having an effective component parallel to the spring force. This support may be a triangular arm pivoted at one vertex to the vehicle body and having a horizontal slot along its side opposite the pivoted vertex and generally parallel to the ground and the upper and lower passes of the track. This slot slidably receives and forms a guideway for the journal blocks of the compensating wheel and receives the spring means which may be a compression spring urging the journal blocks in a chain-tightening direction. A second vertex of the triangle is thus defined by the axis of the journaled shaft of the compensating roller. At the other vertex of the triangle, the hydraulic means may be effective. More specifically, the triangle may be formed unitarily and integrally with a hydraulic cylinder whose piston has a piston rod extending rearwardly from the cylinder (i.e. in a direction parallel to the direction of spring force but in the direction opposite that in which the spring urges the journal block), and is hinged to the body at a location offset from the first pivot.

The above and other objects, features and advantages of the present invention will become more readily apparent from the following description, reference being made to the accompanying drawing, the sole figure of which represents a portion of one track of a track-laying vehicle embodying the present invention, the steering-control means being also shown in diagrammatic form.

In the drawing, I show an endless track 4 of a track-laying vehicle which has a horizontal road-engaging lower pass 4a and an upper horizontal return pass 4b. From the upper pass 4b the track is deflected about an idler and compensating roller 2 along its downward stretch 4c until it engages the road rollers 3. The road rollers, their suspensions, the upper row of track-support rollers and the drive sprocket may be constituted as described in "Principles of Automotive Vehicles." U.S. Government Printing Office, Washington, D.C., 1956 (pages 384–388 and 399–401). The engine and transmission systems described in that publication serve to power the tracks on the opposite side of the vehicle. According to the present invention, however, the idler or compensating roller 2 comprises a triangular support 8 having an upper corner or vertex pivotally secured to a projection 10a extending in the direction of track tensioning from the vehicle body 1 which is here represented in diagrammatic form. The shaft 5 of the idler and compensating roller 2 is journaled directly in a slidable journal block 6 horizontally shiftable in a guideway 9a, 9b formed by the parallel walls of a slot 9 in the triangular support 8 along the side thereof opposite the pivot 10. The left-hand flank 9c of the recess 9 forms a seat for the compression spring 7 which, under precompression to the desired track-tension force, bears upon the journal block 6 and urges it to the right (arrow A). Generally coaxial to the recess 9, I provide, at the third vertex of the triangle, a hydraulic cylinder 11 which is here shown to be formed unitarily in the support 8 and receives a piston 12 whose seal 12a prevents leakage of hydraulic fluid from the cylinder. A piston rod 13 is affixed to the piston 12 and extends rearwardly to an abutment 14 at which the pivot rod 13 forms hinge or pivot 13a. The pivots 10a and 13a each have a horizontal swinging axis perpendicular to the direction A and to the plane of the paper.

When the steering control is actuated (e.g. via shifting of a lever 20) for right-hand or left-hand braking of the track, the conventional steering-control valve 21 is operated to supply fluid from a pump 22 to either cylinder 11 via line 23 or the cylinder of the other track via line 24, excess fluid being returned to the reservoir 25 feeding the pump. The force in the direction of arrow A is thereby increased to brake the respective track and turn the vehicle. Spring 7 acts as a cushion preventing excessive strain upon the track 4. Other means of hydraulically charging the cylinder 11 can, of course, be employed. When the engine and transmission are most efficient as brakes, the normal operating and locking brakes may remain out of use and may be brought into play only after the vehicle is slowed. The system is also particularly effective for emergency steering.

I claim:

1. In a track-laying vehicle having an engine-driven endless track with a working stretch in engagement with the ground and a return stretch out of engagement with the ground, the improvement which comprises steering means including operator-controlled means for selectively adjusting the tension of said track during rotation thereof for varying the resistance thereof to further rotation, said track being provided with a compensating roller between said working stretch and said return stretch, support means mounting said compensating roller on the vehicle body with freedom of movement to tension and detension said track, and means for shifting said support means, said support means including a pivot with a substantially horizontal axis, the means for shifting said support means including a piston-and-cylinder arrangement swingably interposed between said vehicle body and a point on said support means offset from said horizontal axis, said piston-and-cylinder arrangement including a cylinder formed on said support means and adapted to receive a fluid under pressure, and a piston shiftable in said cylinder and pivotally connected with said vehicle body.

2. The improvement defined in claim 1 wherein said support means includes a generally triangular bracket pivotally connected at one vertex with said vehicle body and defining an axis of rotation of said roller at another vertex.

3. The improvement defined in claim 1, further comprising resilient means carried by said support means and biasing said roller yieldably in track-tensioning direction.

4. The improvement defined in claim 3 wherein said compensating roller has a journal block, said support means being formed with a slot extending generally in said direction and slidably receiving said journal block, said resilient means including a compression spring bearing upon said journal block and received in said slot.

5. In a track-laying vehicle having an engine-driven endless track with a working stretch in engagement with the ground and a return stretch out of engagement with the ground, the improvement which comprises steering means including operator-controlled means for selectively adjusting the tension of said track during rotation thereof for varying the resistance thereof to further rotation, said track being provided with a compensating roller between said working stretch and said return stretch, support means mounting said compensating roller on the vehicle body with freedom of movement to tension and detension said track, and means for shifting said support means, said support means including a pivot with a substantially horizontal axis, and a generally triangular bracket pivotally connected at one vertex with said vehicle body and defining an axis of rotation of said roller at another vertex, said means for displacing said support means including a fluid cylinder unitarily formed on said bracket at the other vertex of the triangle and a piston axially shiftable in said cylinder and pivotally connected with said vehicle body at a location offset from the pivot at said one vertex.

6. The improvement defined in claim 5 further comprising resilient means carried by said support means and biasing said roller yieldably in track-tensioning direction.

7. The improvement defined in claim 6 wherein said compensating roller has a journal block, said support means being formed with a slot extending generally in said direction and slidably receiving said journal block, said resilient means including a compression spring bearing upon said journal block and received in said slot.

8. In a track-laying vehicle having an engine-driven endless track with a working stretch in engagement with the ground and a return stretch out of engagement with the ground, the improvement which comprises steering means including operator-controlled means for selectively adjusting the tension of said track during rotation thereof for varying the resistance thereof to further rotation, said track being provided with a compensating between said working stretch and said return stretch, said roller having a journal block, said steering means including a triangular support bracket pivotally mounted upon said vehicle body at one vertex of the triangle for swinging movement about a horizontal axis, said bracket being provided with a guide slot extending along a side of the triangle opposite said one vertex and slidably receiving said journal block, a compression spring received in said slot and bearing upon said journal block while urging said journal block toward another vertex of the triangle, a hydraulic cylinder mounted on said bracket and having an axis generally parallel to said slot, a piston slidable in said cylinder, a piston rod affixed to said piston and extending from said cylinder in the direction opposite that in which said spring urges said journal block, and pivot means articulating said bracket to said vehicle body at a location offset from said one vertex, said operator-controlled means including means for selectively regulating the pressure within said cylinder to adjust the tension on said track.

References Cited

UNITED STATES PATENTS

| | | | |
|---|---|---|---|
| 1,488,629 | 4/1924 | Wick | 180—6.7 X |
| 2,044,306 | 6/1936 | Kegresse | 180—6.54 |
| 2,373,316 | 4/1945 | Landy | 180—6.54 |
| 3,327,798 | 6/1967 | Siber et al. | 180—6.7 |
| 3,101,977 | 8/1963 | Hyler et al. | 305—10 |

FOREIGN PATENTS 1,060,278  11/1953  France.

BENJAMIN HERSH, Primary Examiner

J. A. PEKAR, Assistant Examiner

U.S. Cl. X.R.

305—10